(12) United States Patent
Peng et al.

(10) Patent No.: US 10,825,608 B2
(45) Date of Patent: Nov. 3, 2020

(54) MANUFACTURE METHOD OF MAGNETIC COIL IN WIRELESS CHARGING SYSTEM

(71) Applicants: Shenzhen Yichong Wireless Power Technology Co. Ltd., Shenzhen (CN); Shenzhen Sunlord Electronics Co., Ltd., Shenzhen (CN)

(72) Inventors: Xiaojun Peng, Chengdu (CN); Dezheng Pan, Shenzhen (CN); Changzheng Liu, Shenzhen (CN); Siming Pan, San Jose, CA (US); Tun Li, San Jose, CA (US); Dawei He, Burlingame, CA (US)

(73) Assignee: Shenzhen Yichong Wireless Power Technology Co. Ltd, Shenzhen (CN)

( * ) Notice: Subject to any disclaimer, the term of this patent is extended or adjusted under 35 U.S.C. 154(b) by 356 days.

(21) Appl. No.: 15/699,492

(22) Filed: Sep. 8, 2017

(65) Prior Publication Data
US 2018/0294096 A1    Oct. 11, 2018

Related U.S. Application Data (60) Provisional application No. 62/482,017, filed on Apr. 5, 2017.

(51) Int. Cl.
| | | |
|---|---|---|
| *H01F 7/06* | (2006.01) |
| *H01F 41/082* | (2016.01) |
| *H01F 27/28* | (2006.01) |
| *H01F 27/32* | (2006.01) |
| *H01F 41/061* | (2016.01) |
| *H02J 50/10* | (2016.01) |
| *H02J 7/02* | (2016.01) |

(52) U.S. Cl.
CPC ....... *H01F 41/082* (2016.01); *H01F 27/2823* (2013.01); *H01F 27/32* (2013.01); *H01F 41/061* (2016.01); *H02J 7/025* (2013.01); *H02J 50/10* (2016.02); *Y10T 29/49071* (2015.01)

(58) Field of Classification Search
CPC ............. F16H 2200/2071; B65D 19/42; Y10T 137/87217; Y10T 29/49071; H01F 41/061; H01F 41/082; H02K 7/1846
USPC ......... 29/605, 33 F, 513, 606, 607, 609, 738
See application file for complete search history.

(56) References Cited

U.S. PATENT DOCUMENTS 3,566,462 A * 3/1971 Moore ................... H01F 41/022
29/605
4,896,839 A * 1/1990 Curtis, Jr. ............... H01F 30/16
242/434.7

\* cited by examiner

*Primary Examiner* — Thiem D Phan
(74) *Attorney, Agent, or Firm* — Sheppard Mullin Richter & Hampton LLP (57) ABSTRACT

A method for manufacturing a magnetic coil in a wireless charging system is disclosed. The coil may comprise a wire with a rectangular cross section. The method may include feeding a wire into a routing device which includes three winding wheels; routing the wire into a magnetic coil by changing positions of the winding wheels; and assembling the magnetic coil by pressing and attaching the magnetic coil to a coil holder.

5 Claims, 9 Drawing Sheets

MANUFACTURE METHOD OF MAGNETIC COIL IN WIRELESS CHARGING SYSTEM

CROSS-REFERENCE TO RELATED APPLICATIONS

This application claims the benefit of U.S. Provisional Application Ser. No. 62/482,017, filed Apr. 5, 2017, and entitled "DESIGN OF MAGNETIC COIL IN WIRELESS CHARGING SYSTEM". The entirety of the aforementioned application is incorporated herein by reference.

TECHNICAL FIELD

The disclosure relates generally to a wireless charging system, particularly, to a manufacture method of a magnetic coil with a wire having a rectangular cross section, and a routing device to rout a magnetic coil with a wire having a rectangular cross section.

BACKGROUND

Wireless charging is an evolving technology that may bring a new level of convenience of charging electronic devices. In a wireless charging system, particularly an inductive wireless charging system, energy is transferred from one or more power transmitter (TX) coils to one or more power receiver (RX) coils through magnetic coupling.

The design of electronic devices in which the RX coils reside is often driven by consumer demands. One of such demands relates to the physical dimensions of the electronic devices, particularly, to their thickness. A thinner device is often more popular among consumers.

When incorporating a wireless charging function to the electronic devices, the thickness of the devices may increase to some extent due to the physical dimension of the RX coils. In order to decrease the thickness of the electronic devices, reducing the thickness of the RX coils is of desire.

A thinner RX coil design can be achieved by using a thinner wire. However, a thinner wire, which implies a smaller cross-sectional area, may be associated with a larger resistance, as a direct current (DC) resistance of a magnetic coil is inversely proportional to the cross-sectional area of the wire. A larger resistance can increase the power loss and decrease the efficiency of a wireless charging system. Therefore, reducing the thickness of the RX coils while maintaining or even increasing the system efficiency is of great interest in an RX coil design.

This disclosure presents a method for manufacturing a magnetic coil with a wire having a rectangular cross section, and magnetic coils made by this method will be thinner while maintaining a high system's efficiency.

SUMMARY

The present disclosure is directed to a method for manufacturing a magnetic coil in a wireless charging system. The coil may comprise a wire with a rectangular cross section. The method may include feeding a wire into a routing device, which includes three winding wheels; routing the wire into a magnetic coil by changing positions of the winding wheels; and assembling the magnetic coil by pressing and attaching the magnetic coil to a coil holder.

Another aspect of this disclosure is directed to a routing device for routing a wire to form a magnetic coil. The device may include a guide device for guiding the wire; three winding wheels; and three dabbers. Each dabber matches with one winding wheel.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several non-limiting embodiments and, together with the description, serve to explain the disclosed principles.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Figure 1:
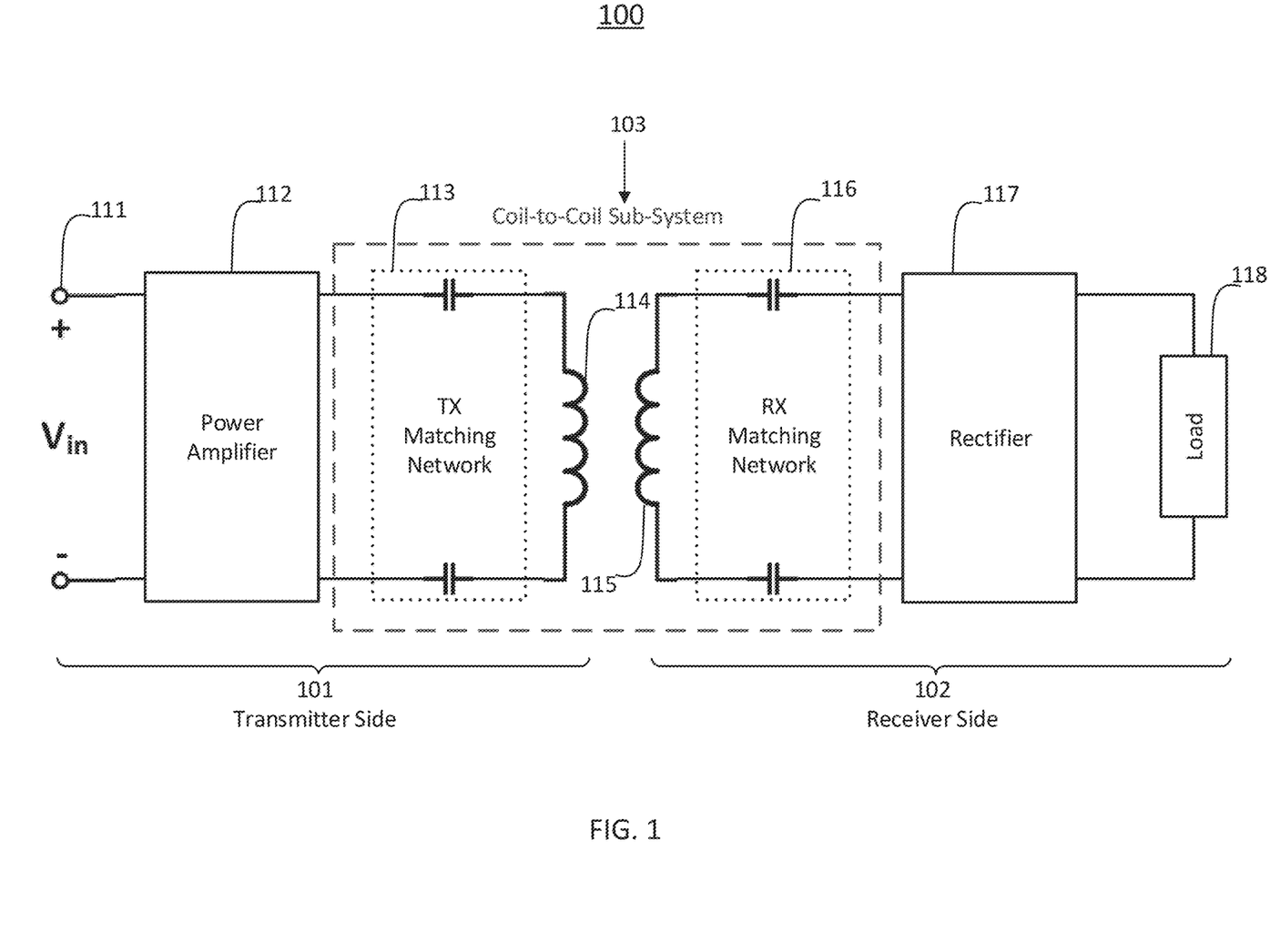
FIG. 1 is a block diagram illustrating a wireless charging system, consistent with exemplary embodiments of the present disclosure.

FIG. 1 is a block diagram illustrating a wireless charging system 100, consistent with exemplary embodiments of the present disclosure. The system 100 may comprise a number of components, some of which may be optional. In some embodiments, the system 100 may include many more components than those shown in FIG. 1. However, it is not necessary that all of these components be shown in order to disclose an illustrative embodiment.

The system 100 may include a transmitter side 101 and a receiver side 102. The transmitter side 101 may include power input nodes (+ and −) 111, a power amplifier 112, and a power transmitter. The power transmitter may include a TX matching network 113, and one or more TX coils 114. The receiver side 102 may include a power receiver, a rectifier 117, and a load 118 of a RX device. The power receiver may include one or more RX coils 115 and a RX matching network 116. The load 118 can be a battery of a device to be charged. The device can be a mobile device, a wearable device, a tablet device, a computer, a car, or any device that includes a chargeable battery. The one or more RX coils can be coupled to the device. The power input nodes 111 may be coupled to the power amplifier 112. The power amplifier 112 may be coupled to the TX matching network 113. The TX matching network 113 may be coupled to one or more TX coils 114. The TX matching network 113 may include one or more capacitors. Capacitance of one or more of the capacitors may be adjustable. The TX matching network 113 and the TX coil(s) 114 may form a resonant circuit or an LC circuit where the L represents the TX coil(s) and C represents the capacitor connected together. The frequency of the LC circuit can be adjusted by adjusting the capacitance of the TX matching network 113. The TX coil(s) 114 may be coupled with one or more RX coils 115 via magnetic coupling. In the receiver side 102, the RX coil(s) 115 may be coupled to the RX matching network 116, the RX matching network 116 may be coupled to the rectifier 117, and the rectifier 117 may be coupled to the load 118. The RX matching network 116 may include one or more capacitors. One or more capacitors may have adjustable capacitance. The capacitors may be used to adjust the frequency of an LC circuit formed by the RX coil(s) 115 and the RX matching network 116. Accordingly, the resonant frequency of the LC circuit can be determined by tuning the capacitance of the capacitors. The TX matching network 113, TX coil(s) 114, RX coil(s) 115 and RX matching network 116 form a coil-to-coil sub-system 103.

An input voltage is converted from a DC power to an alternating-current (AC) power and amplified by the power amplifier 112. Then the power is transmitted from the transmitter side 101 to the receiver side 102 through two or more coupled magnetic coils. The AC voltage received at the receiver side 102 is regulated back to a DC voltage by the rectifier 117 and then delivered to the load 118.

In a wireless charging system, the magnetic coil(s) can be designed to achieve a large effective charging area while minimizing the physical dimension of the magnetic coil by changing its parameters. The effective charging area of a set of a TX coil and a RX coil refers to a charging area, where if the center of a RX coil is placed inside of the area, a coil-to-coil efficiency between the TX coil and the RX coil should be no less than a desired value (e.g., a value desired or pre-determined by a user, for example, 90%). The effective charging area may be on a horizontal plane that is parallel to the TX coil. For example, the effective charging area may be on the same plane as the TX coil. "Horizontal" may refer to a direction that is parallel to the plane of a TX or RX coil, while "vertical" may refer to a direction that is perpendicular to the plane. A radius of the effective charging area may be defined as the horizontal distance between the center of a TX coil (e.g., a vertical projection of the center on a horizontal plane where the effective charging area resides) and the boundary of the effective charging area. In some embodiments, the vertical distance between the TX and RX coils may vary from 0-7 mm. A coil-to-coil efficiency refers to the efficiency between a TX coil and a RX coil. It is calculated by the ratio of a RX coil output power (e.g., alternating current (AC) power) over a TX coil input power (e.g., AC power). The loss that affects the coil-to-coil efficiency includes the loss in the coils, the parasitic resistance loss of the TX and RX matching capacitors, and other losses.

Figure 2:
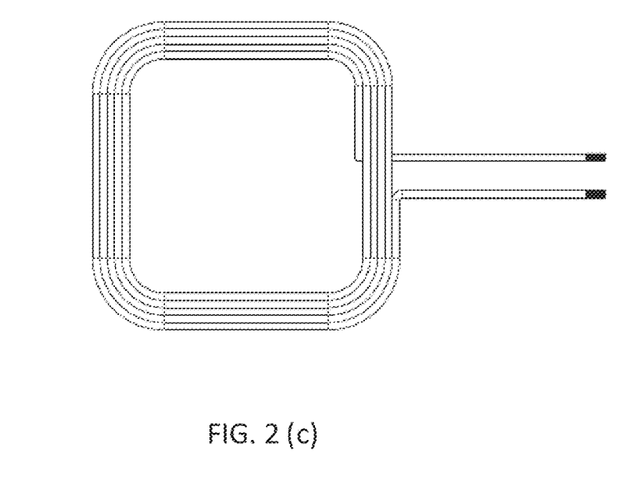
FIGS. 2(a)-2(d) are graphical representations illustrating exemplary magnetic coils, consistent with exemplary embodiments of the present disclosure.

The parameters of a magnetic coil may refer to a coil shape, turn number, outer diameter, inner diameter, wire type, coil structure, etc. A magnetic coil may have different shapes: circular, square, elliptical, etc. The wire type may be a Litz wire, an enamel wire, a flexible printed circuit (FPC), etc. The coil structure may include a tight routing structure and a sparse routing structure, etc. A tight routing structure may refer to an insulated wire that is routed closely with no space between adjacent turns, while a sparse routing structure may refer to a magnetic coil that includes spaces between adjacent turns of the insulated wire. Exemplary magnetic coil designs are presented in FIGS. 2(a)-2(d). FIG. 2(a) shows an elliptical coil with a tight routing structure, FIG. 2(b) shows a circular coil with a sparse routing structure, FIG. 2(c) shows a square-shape coil with a tight routing structure, and FIG. 2(d) shows a circular coil with a tight routing structure. Based on simulations and experiments, these parameters can be tuned to optimize the coil-to-coil efficiency. In some embodiments, the wire is routed into the coil on one plane, as shown in FIGS. 2(a)-(d).

Figure 3A:
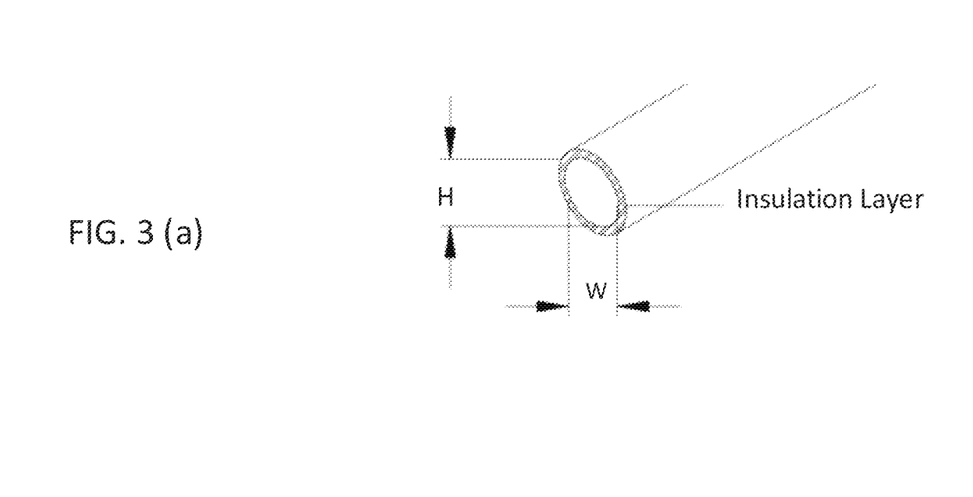
FIGS. 3(a)-3(c) are graphical representations illustrating a round enamel wire, a flexible printed circuit wire, and a rectangular enamel wire, consistent with exemplary embodiments of the present disclosure.

The TX and/or RX coils may use an enamel wire or an FPC wire. An enamel wire is a type of wire which has a core of a conducting material, for example, a metal, and is coated with a thin layer of an insulation material. In some embodiments, the core of the wire is made of copper or aluminum. The diameter of a typical round enamel wire may range from 11.684 mm to 0.0799 mm (AWG40 to AWG0000). AWG refers to American wire gauge, which is a standardized wire gauge system used for the diameters of round, solid, non-ferrous, and electrically conducting wire. The thickness of the insulation layer may have 3 levels: Grade 1, Grade 2, and Grade 3. A higher grade has a thicker insulation layer, and a higher breakdown voltage. FIG. 3(a) is a graphical representation illustrating a round enamel wire, consistent with exemplary embodiments of the present disclosure. For a round enamel wire, its wire height H equals to its wire width W and equals to its diameter. As a result, reducing the wire height of a round enamel wire will reduce its cross-sectional area simultaneously. When the wireless charging operating frequency is low and the DC resistance dominates the coil loss, this may result in an increase of the DC resistance of the magnetic coil and a decrease of the system efficiency.

Figure 3B:
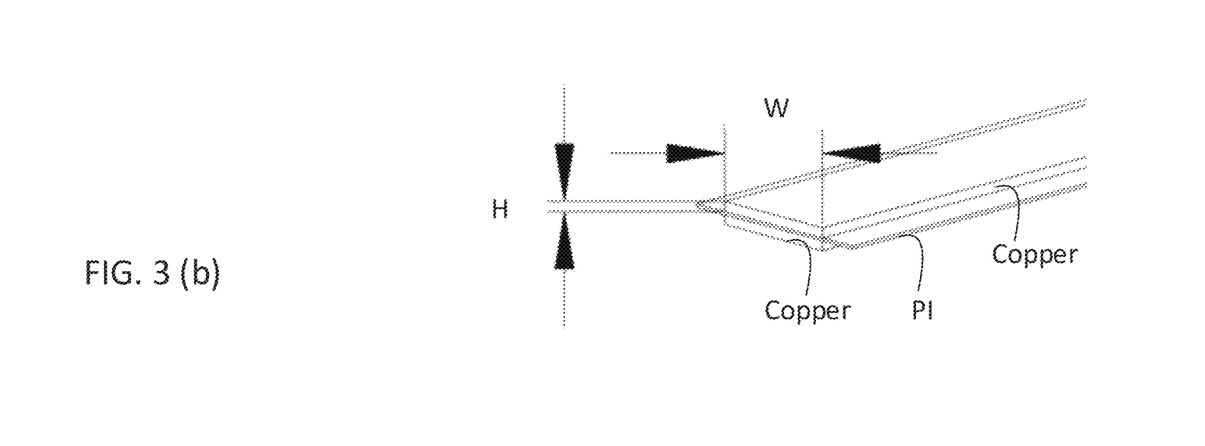

An FPC wire may include a structure of one layer of a dielectric material sandwiched by two layers of conductive materials. An exemplary FPC wire with a layer of polyimide (PI) and two layers of copper is shown in FIG. 3(b). One cross-sectional area of an FPC wire can be estimated by H×W, where H is the height of one copper layer, and W is the width of the copper. The height H may range from 0.0175 mm to 0.105 mm, and the width W may have no limitation. In some embodiments, the width W can be under 0.07 mm. For an FPC wire, when reducing the height H, the cross-sectional area can be compensated by increasing the width W, so that the DC resistance of the magnetic coil may not be affected. However, the width W of an FPC wire may be limited by the increasing price of its manufacture once W exceeds its typical value (0.07 mm). Besides, the dielectric layer, adding an additional height to the FPC wire, is not removable.

Figure 3C:
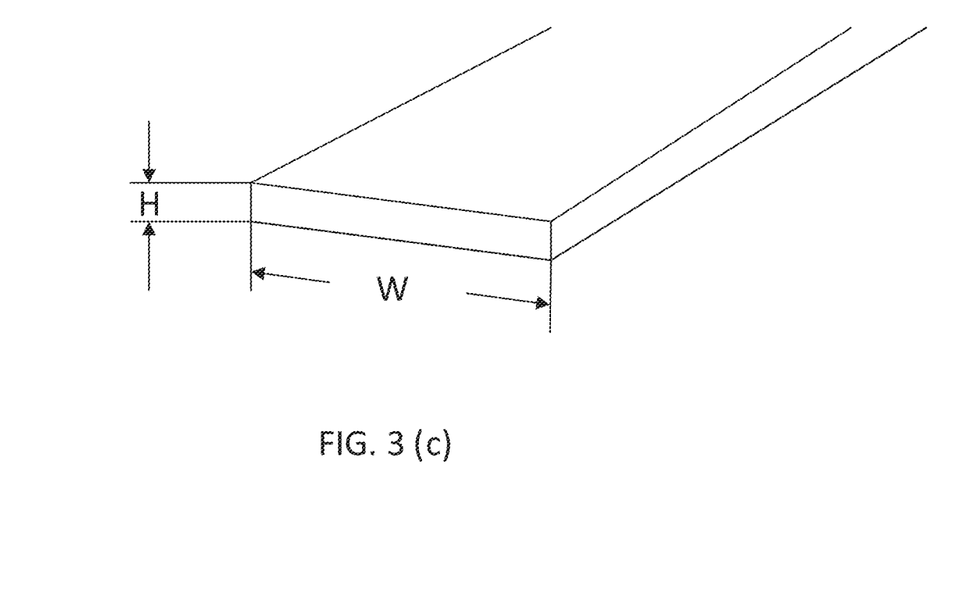

This disclosure presents a wire with a rectangular cross-sectional area, as shown in FIG. 3(c). The wire may be made of a conducting material, for example, a metal. In some embodiments, the wire is made of copper or aluminum. In some embodiments, the wire can be an enamel wire, which has an insulation coating. The height H and width W of a rectangular wire can both vary between 11.684 mm to 0.0799 mm. In one embodiment, the rectangular wire may have an H of 0.12 mm and a W of 0.6 mm. The ratio of W/H of a rectangular wire may range from 1 to 15, while W/H of an FPC wire is usually above 3. Therefore, with a design of the rectangular wire, both height and width are adjustable in a wider range while being able to maintain the cross-sectional area, ideal for wireless charging systems operating at the frequencies where DC resistance dominates the coil loss. The rectangular enamel wire may meet dimension requirements for various electronic devices. In addition, the rectangular enamel wire bears no additional dielectric layer, therefore, it is more efficient in terms of space-saving. Also compared with an FPC coil, a magnetic coil made of a rectangular enamel wire may be simpler to manufacture and more cost-efficient. The rectangular wire shown in FIG. 3(c) can be used in TX and/or RX coils in wireless charging systems. For example, the rectangular wire shown in FIG. 3(c) can be used to make magnetic coils shown in FIGS. 2(a)-(d). In addition, the rectangular wires used in FIGS. 2(a), (c), and (d) may have insulation coatings.

Figure 4:
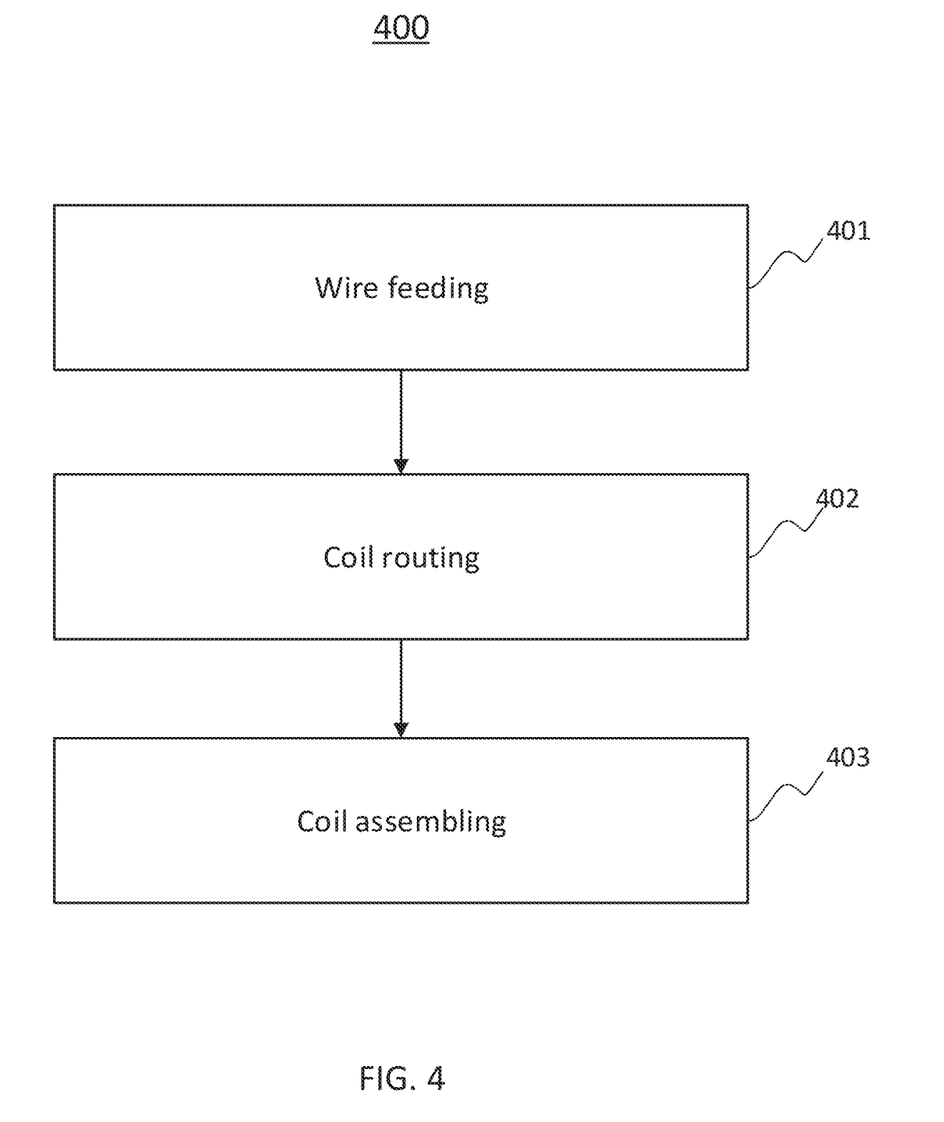
FIG. 4 is a flow diagram illustrating a method of manufacturing a magnetic coil with a wire having a rectangular cross-section, consistent with exemplary embodiments of the present disclosure.

A magnetic coil (TX or RX coil) with a wire of a rectangular cross-section, for example, an enamel wire, may be manufactured by processes including wire feeding 401, coil routing 402, and coil assembling 403, as illustrated in FIG. 4.

A wire feeding process 401 is a process to feed an enamel wire to a routing device and stretch the wire to make it straight in the meantime. A coil routing process 402 is a process to form a coil using the enamel wire from a wire-feeding device. A coil assembling process 403 is a process to assemble the formed coil to a steady device, to ensure the stability of the coil form during packaging, shipping, etc.

Figure 5:
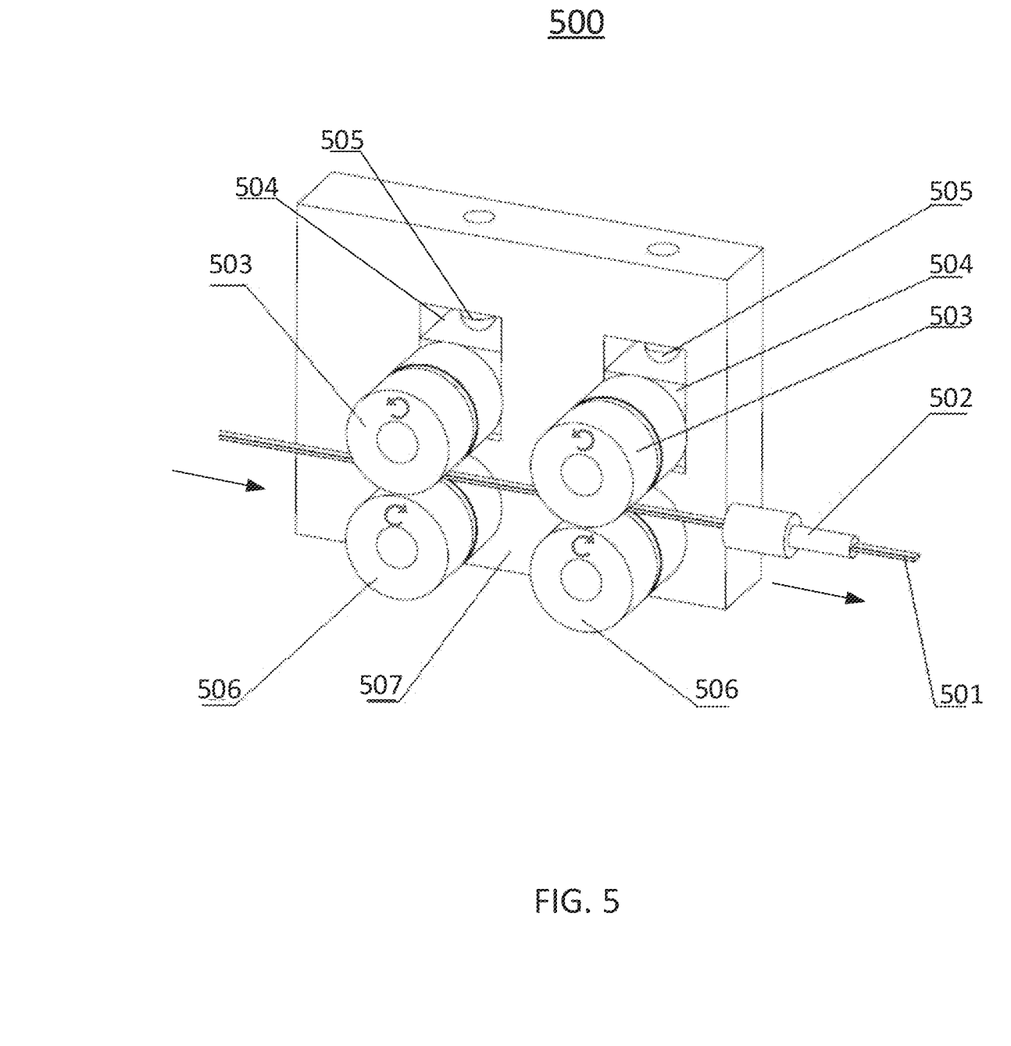
FIG. 5 is a graphical representation illustrating a wire feeding device, consistent with exemplary embodiments of the present disclosure.

FIG. 5 is a graphical representation illustrating a wire feeding device 500, consistent with exemplary embodiments of the present disclosure. The feeding device 500 may comprise a number of components, some of which may be optional. In some embodiments, the device 500 may include many more components than those shown in FIG. 5. However, it is not necessary that all of these components be shown in order to disclose an illustrative embodiment.

As shown in FIG. 5, the device 500 may include a guide device 502, two upper wire feeding wheels 503, two feeding wheel holders 504, two feeding wheel adjustment devices 505, two lower wire feeding wheels 506, and a device holder 507. FIG. 5 shows a wire 501 being fed into the device 500. In some embodiments, the wire 501 is a wire with a rectangular cross section, and in some embodiments, the wire 501 may be covered with an insulation material, such as an enamel wire.

During the wire feeding, the wire 501 may be guided by the guide device 502 and fed through the upper and lower wheels 503 and 506. Each of the wheels 503 and 506 may have a groove that matches with the width of the wire 501, and the wire 501 may fit into these grooves when moving through the wheels 503 and 506. The grooves may have a rectangular cross-section. When feeding, the wheels 503 and 506 are rotating simultaneously at the same rate with opposite directions on their circumferences where the wire 501 is positioned.

The adjustment devices 505 may be used to adjust the positions of the wheel holders 504. Also by slightly adjusting the upper and lower wheels 503 and 506, a force on the wire 501 can be placed and adjusted. By applying such force to the wire 501, the wire 501 may be deformed. The deformation value of the wire 501 may be restricted to be within its elastic ultimate deformation range, so that the wire can recover from the deformation once the force is removed. One or more feeding devices with different set-ups (e.g., groove size, force value, etc.) may be used during the wire feeding process.

Figure 6A:
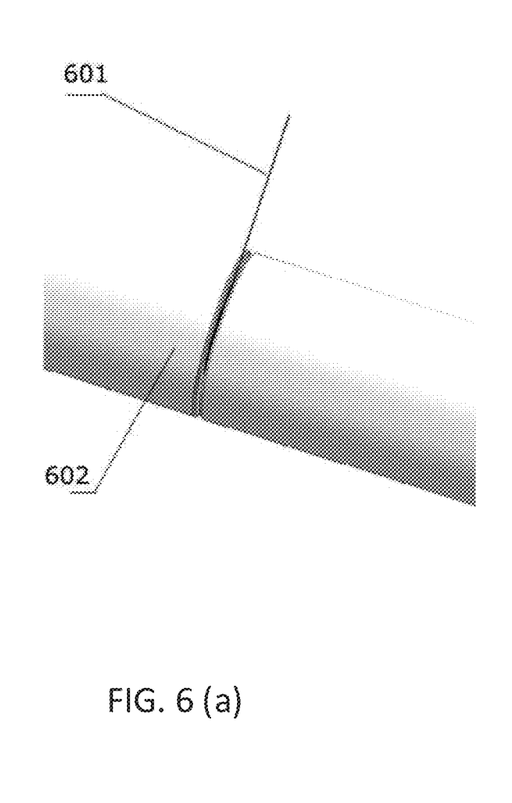
FIG. 6(a) is a graphic representation illustrating a coil winding spindle.

FIG. 6(a) shows a graphical representation illustrating a coil winding spindle 602, consistent with exemplary embodiments of the present disclosure. A winding spindle 602 may rotate and wind a wire 601 to form a coil. This routing device may be used for routing a round wire with a tight routing design. In addition, to prevent deformation of the routed coil, auto-adhesion is often used during the coil routing process.

Figure 6B:
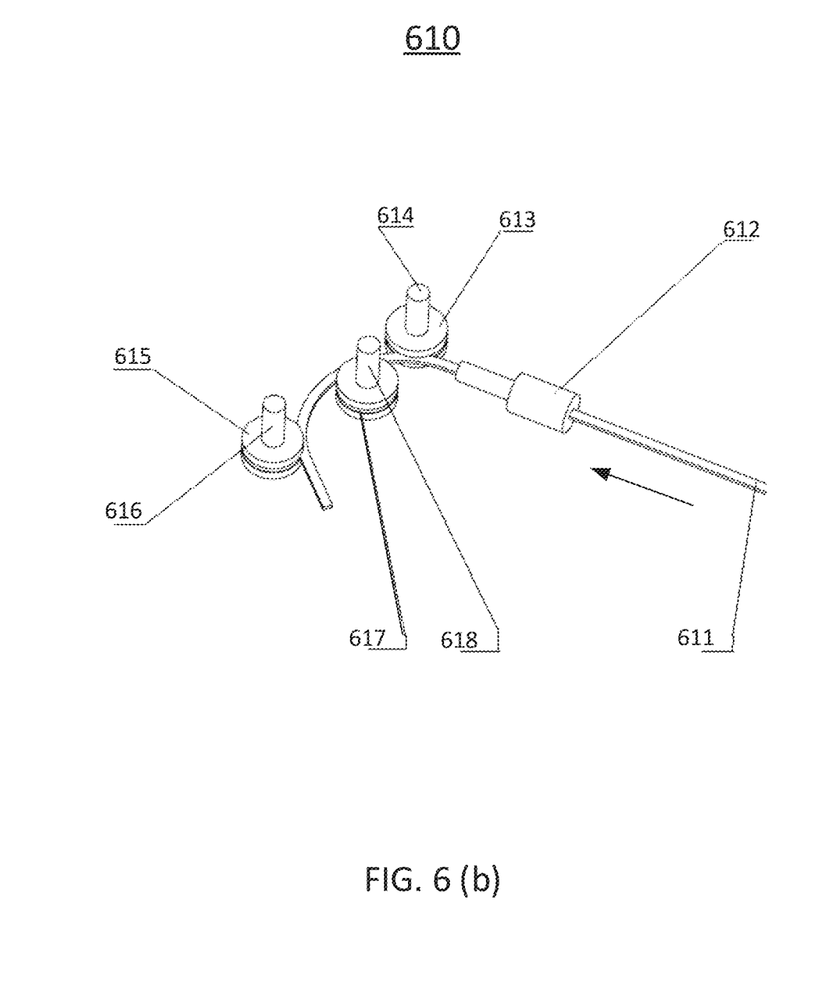
FIG. 6(b) is a graphic representation illustrating a coil routing device, consistent with exemplary embodiments of the present disclosure.

To route a magnetic coil with a rectangular enamel wire or with a sparse routing coil structure, FIG. 6(b) shows a graphical representation illustrating a coil routing device 610, consistent with exemplary embodiments of the present disclosure. The routing device 610 may comprise a number of components, some of which may be optional. In some embodiments, the device 610 may include many more components than those shown in FIG. 6(b). However, it is not necessary that all of these components be shown in order to disclose an illustrative embodiment. In one embodiment, the magnetic coil is a TX coil and in another embodiment, the magnetic coil is a RX coil.

As shown in FIG. 6(b), the routing device 610 may include a rectangular enamel wire 611, a guide device 612, three winding wheels 613, 615, and 617, and three dabbers 614, 616 and 618, each of which matches with a winding wheel respectively.

The winding wheels 613, 615, and 617 may have anti jumper grooves on the outer surface. The size of the anti jumper grooves matches with the size of the wire 611. For example, the height of the anti jumper grooves may match the height of the wire 611. During the routing process, the wire 611 may fit into the anti jumper grooves and move through the wheels, so that the anti jumper grooves can help preventing damages to the wire's outer surface. Different sets of winding wheels 613, 615, and 617 may have different sizes of anti jumper grooves. Based on the size of the wire 611, the set of wheels with matched anti jumper grooves may be chosen in the device 610 for the routing process. The winding wheels 613, 615 and 617 and their associated dabbers 614, 616 and 618 can rotate relatively to reduce the relative sliding between the wire and the wheels in the tangential direction of the coil's curvature. This can further reduce damages to the wire's outer surface during the routing process.

A coil structure may include both straight and curved parts of a wire, and the two successive straight parts may be connected by a curved part. The wire 611 may be bent or buckled to form a curvature by the three winding wheels 613, 615 and 617. By changing the positions of the wheels 613, 615 and 617, the radius of the curvature can be changed accordingly. The radius of the curvature (R) may be no less than four times of the width of the wire 611, and may be no less than the height of the wire 611, i.e., R≥4 W and R≥H. By continuously changing the positions of the wheels, the wire 611 can be routed to form a coil in a plane.

Figure 7:
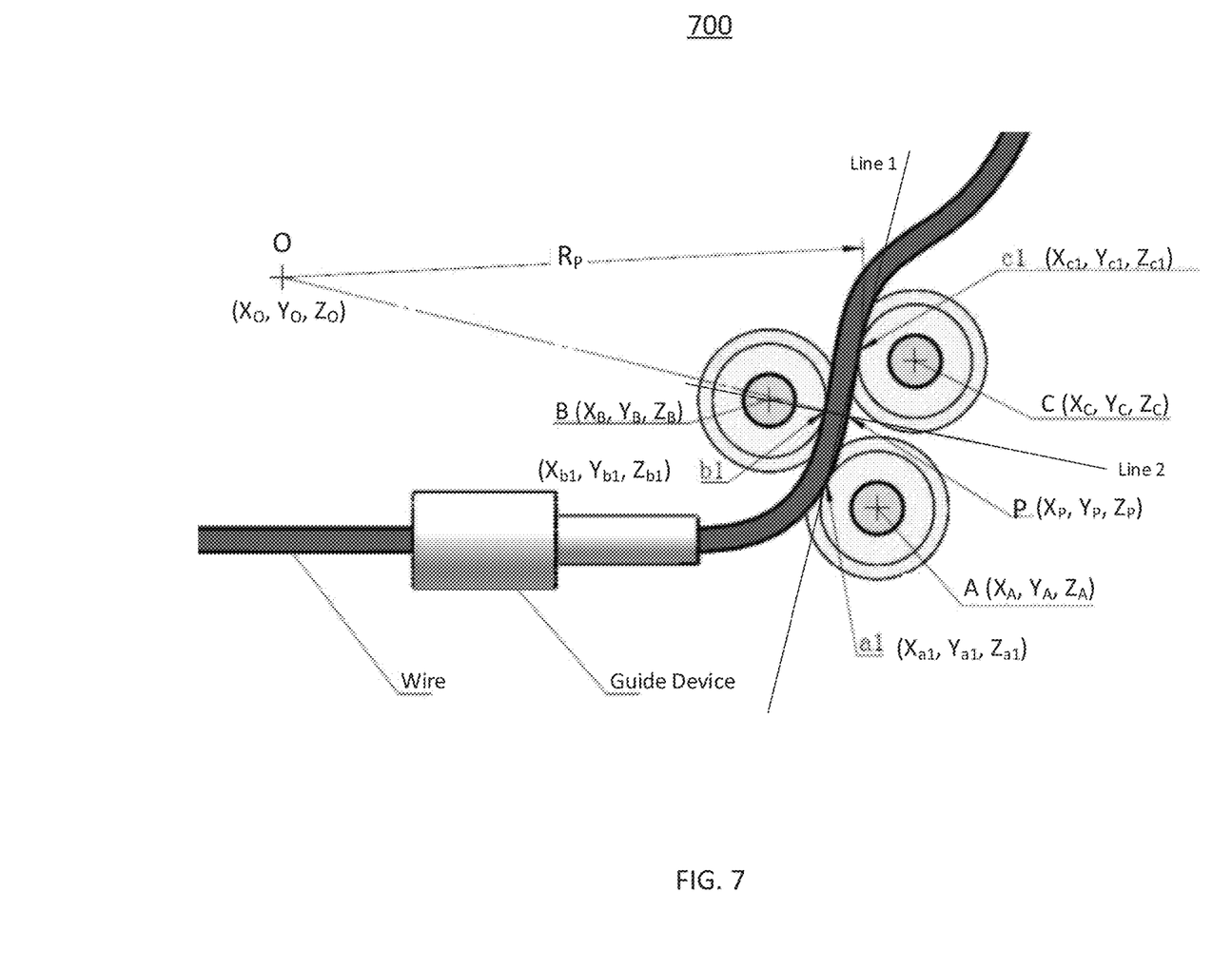
FIG. 7 is a graphic representation illustrating a method of routing a magnetic coil, consistent with exemplary embodiments of the present disclosure.

FIG. 7 is a graphic representation illustrating a method of routing a magnetic coil with a routing device, consistent with exemplary embodiments of the present disclosure. As shown in FIG. 7, centers of three winding wheels of the routing device locate at points A ($X_A$, $Y_A$, $Z_A$), B ($X_B$, $Y_B$, $Z_B$) and C ($X_C$, $Y_C$, $Z_C$), respectively. A wire is fed into the routing device through a guide device. When the wire moves through the routing device, it may contact with the three winding wheels at a1 ($X_{a1}$, $Y_{a1}$, $Z_{a1}$), b1 ($X_{b1}$, $Y_{b1}$, $Z_{b1}$) and c1 ($X_{c1}$, $Y_{c1}$, $Z_{c1}$), respectively. Accordingly, the three winding wheels may apply forces to the wire at points a1, b1 and c1, respectively.

A first line can be drawn connecting points a1 and c1, denoted as Line 1; and a second line which is perpendicular to Line 1 can be drawn though point B, denoted as Line 2. A point where Line 2 intersects the wire is denoted as P, located at ($X_P$, $Y_P$, $Z_P$). In other words, any point P on the wire can be defined by its corresponding Line 1 and Line 2. Since Line 1 and Line 2 are directly related to the positions of centers A, B, and C of the winding wheels, any point P on the wire can be controlled by the winding wheels.

For example, a point P is on a curved part of the wire, which has a center of curvature, denoted as O, located at ($X_O$, $Y_O$, $Z_O$), and a radius of curvature, denoted as $R_p$. The radius of curvature of any point P on the wire may be set by the magnetic coil design. Point c1 is a point on the already routed part of the wire, accordingly its location ($X_{c1}$, $Y_{c1}$, $Z_{c1}$) is also known. Given any point P, its corresponding a1 ($X_{a1}$, $Y_{a1}$, $Z_{a1}$) and O ($X_O$, $Y_O$, $Z_O$) can be calculated based on geometry principles with the known values of ($X_P$, $Y_P$, $Z_P$), ($X_{c1}$, $Y_{c1}$, $Z_{c1}$) and $R_p$. Since Line 1 (i.e., Line a1c1) and Line 2 (i.e., Line BP) are perpendicular to each other, and the width W of the wire is also known, the position of point b1 ($X_{b1}$, $Y_{b1}$, $Z_{b1}$) can be calculated. Accordingly, the positions of the centers of the winding wheels A ($X_A$, $Y_A$, $Z_A$), B ($X_B$, $Y_B$, $Z_B$) and C ($X_C$, $Y_C$, $Z_C$) can be calculated. In other words, the curvature of any point P on the wire is related to the positions of A, B and C. By setting the positions of the winding wheels, the desired curvature of any point on the wire can be obtained; and by forming curvatures of points on the wire, the desired routing of a magnetic coil can be obtained.

To keep the form of the routed magnetic coil, either a positioning tool or a piece of carrier film can be used. A positioning tool is a tool that contains grooves. These grooves may be manufactured to match with the shape and turns of the magnetic coil, so that the magnetic coil can be placed into the grooves to prevent deformation. A carrier film is a film that has an adhesive layer. During the routing process, the carrier film may move accordingly to the coil routing, and the routed magnetic coil may be attached to the carrier film piece by piece and fixed to its desired shape.

Figure 8:
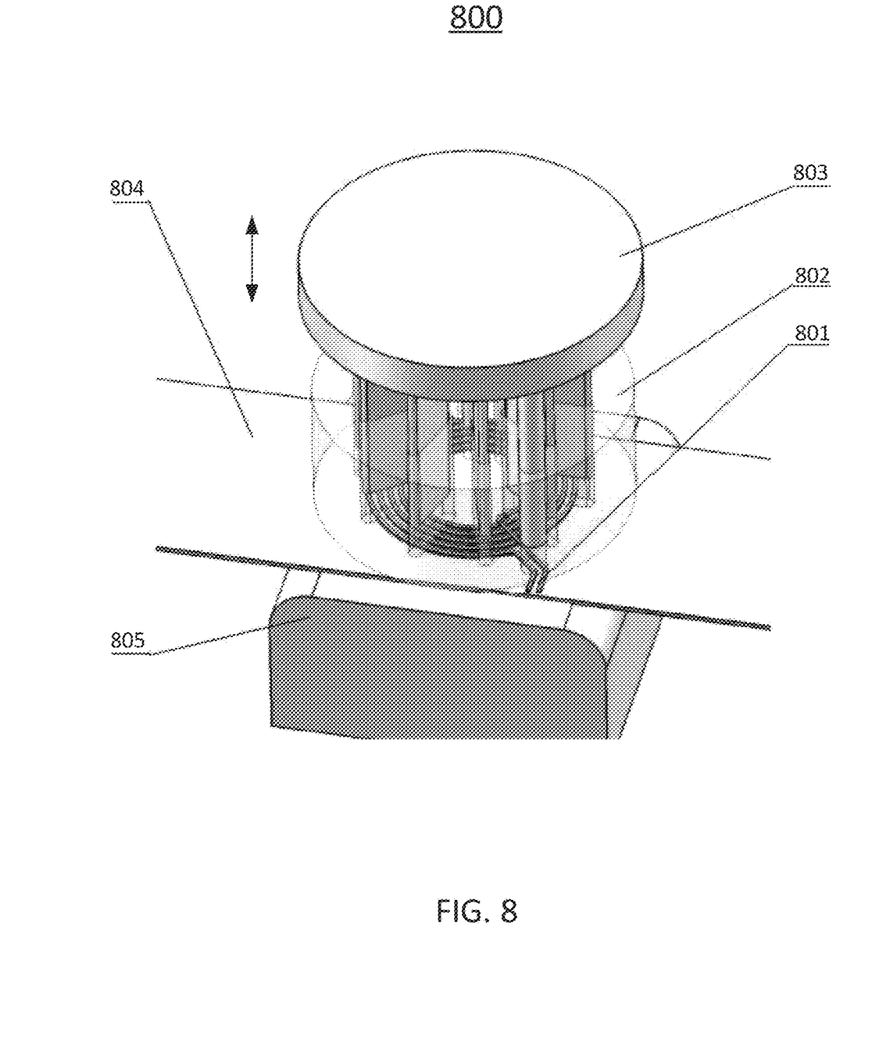
FIG. 8 is a graphical representation illustrating a coil assembling device, consistent with exemplary embodiments of the present disclosure.

FIG. 8 shows a graphical representation illustrating a coil assembling device 800, consistent with exemplary embodiments of the present disclosure. The device 800 may comprise a number of components, some of which may be optional. In some embodiments, the device 800 may include many more components than those shown in FIG. 8. However, it is not necessary that all of these components be shown in order to disclose an illustrative embodiment. In one embodiment, the magnetic coil is a TX coil and in another embodiment, the magnetic coil is a RX coil.

As shown in FIG. 8, the device 800 may include a magnetic coil 801, a location device 802, a combined pressure head 803, a coil holder 804, and a combined scale-board 805. During the assembling process, the coil holder 804 may be first put on to the scale-board 805. The magnetic coil 801 may be placed onto the coil holder 804 with the location device 802 in place to prevent deformation. The location device 802 may include grooves and provide size-control as well as protection of every part of the magnetic coil 801. After the combined pressure head 803 moves to the assembling position, the magnetic coil 801 can be pressed and attached to the coil holder 804 by the combined pressure head 803. The surface of the coil holder 804 may include a film adhesive layer partially or entirely. With the force applied by the combined pressure head 803, the magnetic coil 801 may adhere to the coil holder 804. Once the assembling process is completed, the location device 802 and the combined pressure head 803 can be removed. The magnetic coil and the attached coil holder may be assembled as a whole piece.

In one embodiment, the coil holder is permanently attached to the magnetic coil as part of a final product. In another embodiment, the coil holder is temporarily attached to the magnetic coil and is removable. The coil holder may include heat-sensitive adhesive. It may be attached to the magnetic coil during the assembling process, and when needed, by changing the temperature of the coil holder, it may lose its stickiness and removed from the magnetic coil.

In addition, the assembling of the magnetic coil and coil holder can also be achieved via ultrasonic welding. By connecting the combined pressure head and an ultrasonic welding head, the surface film of the coil holder may be welded with the magnetic coil via ultrasonic. The condition for using ultrasonic welding is that the surface film of the coil holder is made of a material that is able to be welded by ultrasonic.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A method for manufacturing a magnetic coil in a wireless charging system, wherein the coil comprises a wire with a rectangular cross section, the method comprising:
   feeding a wire into a routing device which includes three winding wheels;
   routing the wire into a magnetic coil by changing positions of the winding wheels;
   assembling the magnetic coil by pressing and attaching the magnetic coil to a coil holder;
   obtaining a position of a first point P ($X_P$, $Y_P$, $Z_P$) on the wire, a radius of curvature of the first point $R_p$, and a position of a second point c1 ($X_{c1}$, $Y_{c1}$, $Z_{c1}$);
   calculating a position of a third point a1 ($X_{a1}$, $Y_{a1}$, $Z_{a1}$), and a center of curvature of the first point O ($X_O$, $Y_O$, $Z_O$);
   calculating a position of a fourth point b1 ($X_{b1}$, $Y_{b1}$, $Z_{b1}$); and
   calculating positions of centers of the winding wheels A ($X_A$, $Y_A$, $Z_A$), B ($X_B$, $Y_B$, $Z_B$) and C ($X_C$, $Y_C$, $Z_C$), wherein the winding wheels contact with the wire at points a1 ($X_{a1}$, $Y_{a1}$, $Z_{a1}$), b1 ($X_{b1}$, $Y_{b1}$, $Z_{b1}$) and c1 ($X_{c1}$, $Y_{c1}$, $Z_{c1}$), and a first line that passes through points P and B is perpendicular to a second line that passes through points a1 and c1.

2. The method of claim 1, wherein the surface of the wire has an insulating layer.

3. The method of claim 1, wherein the coil has multiple turns of the wire, and two adjacent turns are spaced with a distance.

4. The method of claim 1, wherein the distance between adjacent turns ranges from 0.1 mm to 1 mm.

5. The method of claim 1, further comprising forming a curvature of a point on the wire by setting positions of the winding wheels.

* * * * *

UNITED STATES PATENT AND TRADEMARK OFFICE
CERTIFICATE OF CORRECTION

PATENT NO.       : 10,825,608 B2
APPLICATION NO.  : 15/699492
DATED            : November 3, 2020
INVENTOR(S)      : Xiaojun Peng et al.

Page 1 of 1

It is certified that error appears in the above-identified patent and that said Letters Patent is hereby corrected as shown below:

On the Title Page

Item (73) In the Assignee:
Should read:
--Shenzhen Yichong Wireless Power Technology Co., Ltd, Shenzhen (CN)
Shenzhen Sunlord Electronics Co., Ltd, Shenzhen (CN)--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*